Nov. 3, 1931.  J. HARTNESS  1,829,797
THREAD GAUGING
Filed May 18, 1927    10 Sheets-Sheet 1

Inventor:
James Hartness
by Wright, Brown, Quinby & May
Attys.

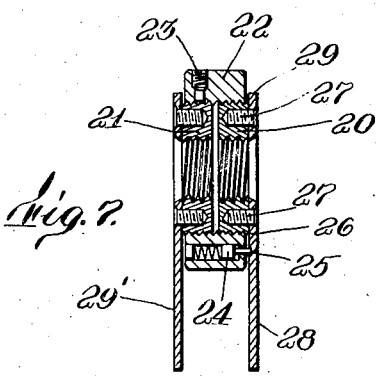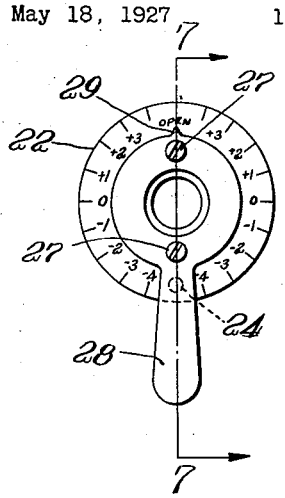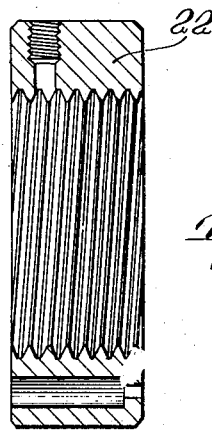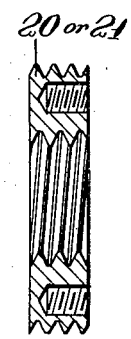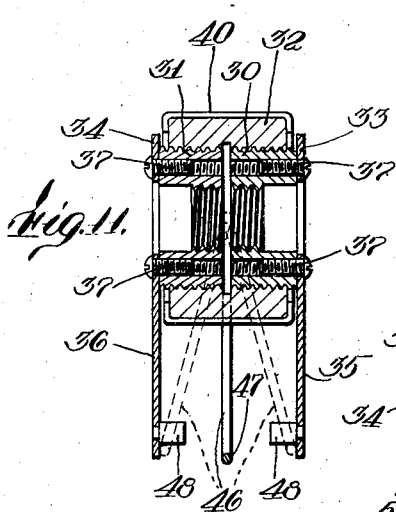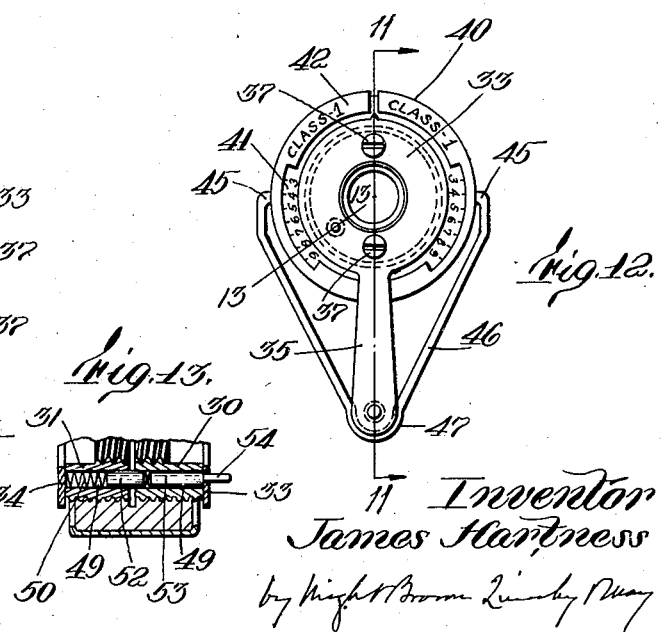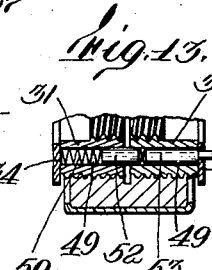

Nov. 3, 1931.  J. HARTNESS  1,829,797
THREAD GAUGING
Filed May 18, 1927   10 Sheets-Sheet 3
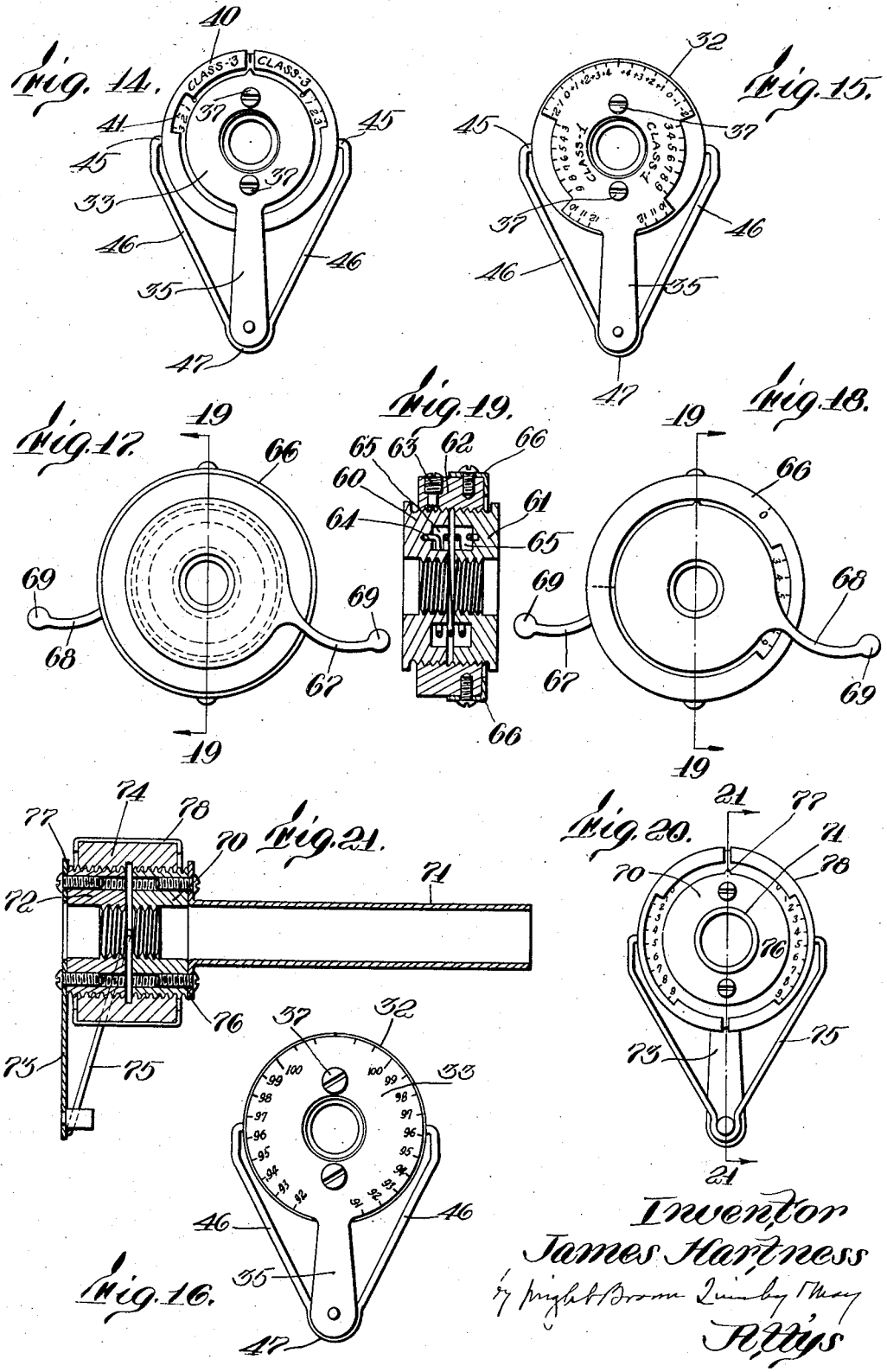
Inventor
James Hartness Nov. 3, 1931. J. HARTNESS 1,829,797
THREAD GAUGING
Filed May 18, 1927 10 Sheets-Sheet 4

Inventor
James Hartness
by Knight & Brown Quimby May
Attys.

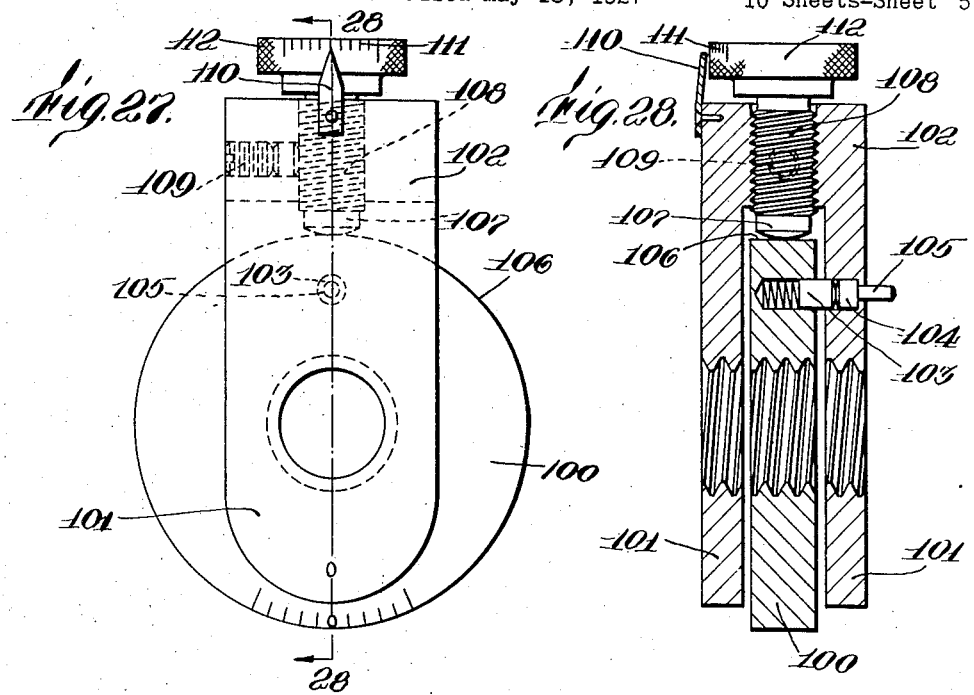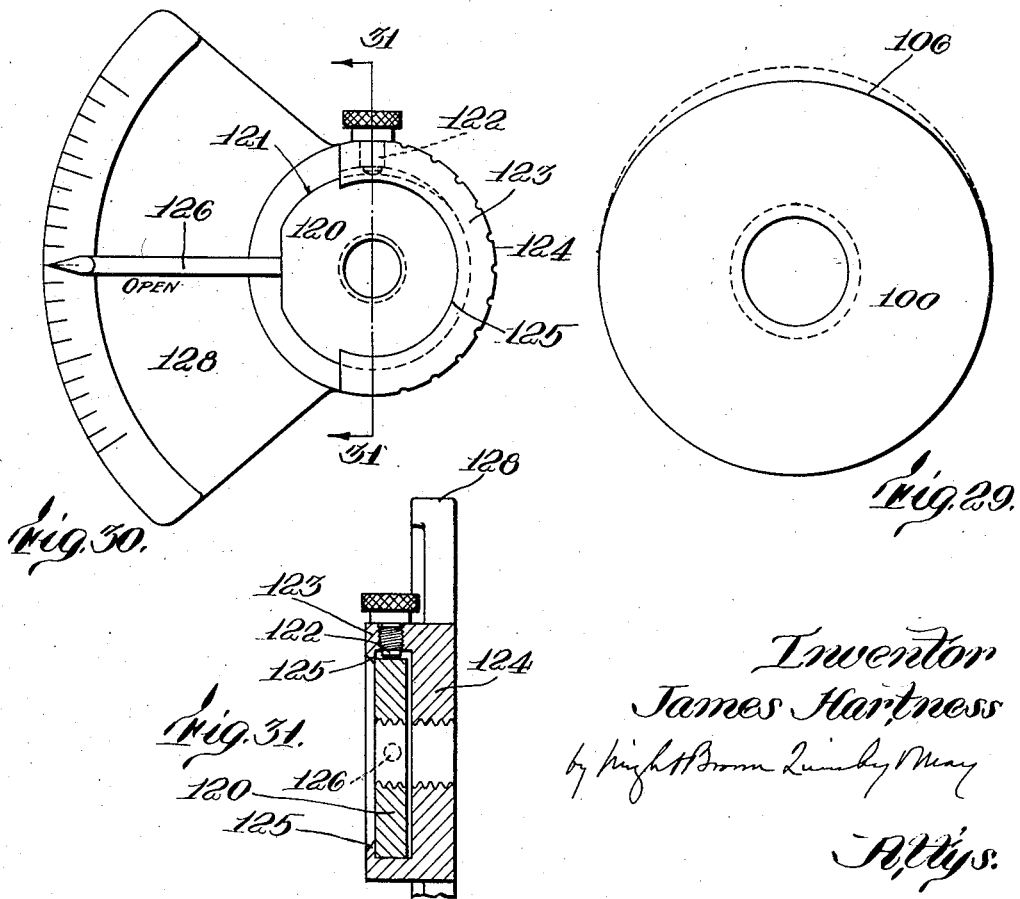

Nov. 3, 1931.  J. HARTNESS  1,829,797
THREAD GAUGING
Filed May 18, 1927   10 Sheets-Sheet 6
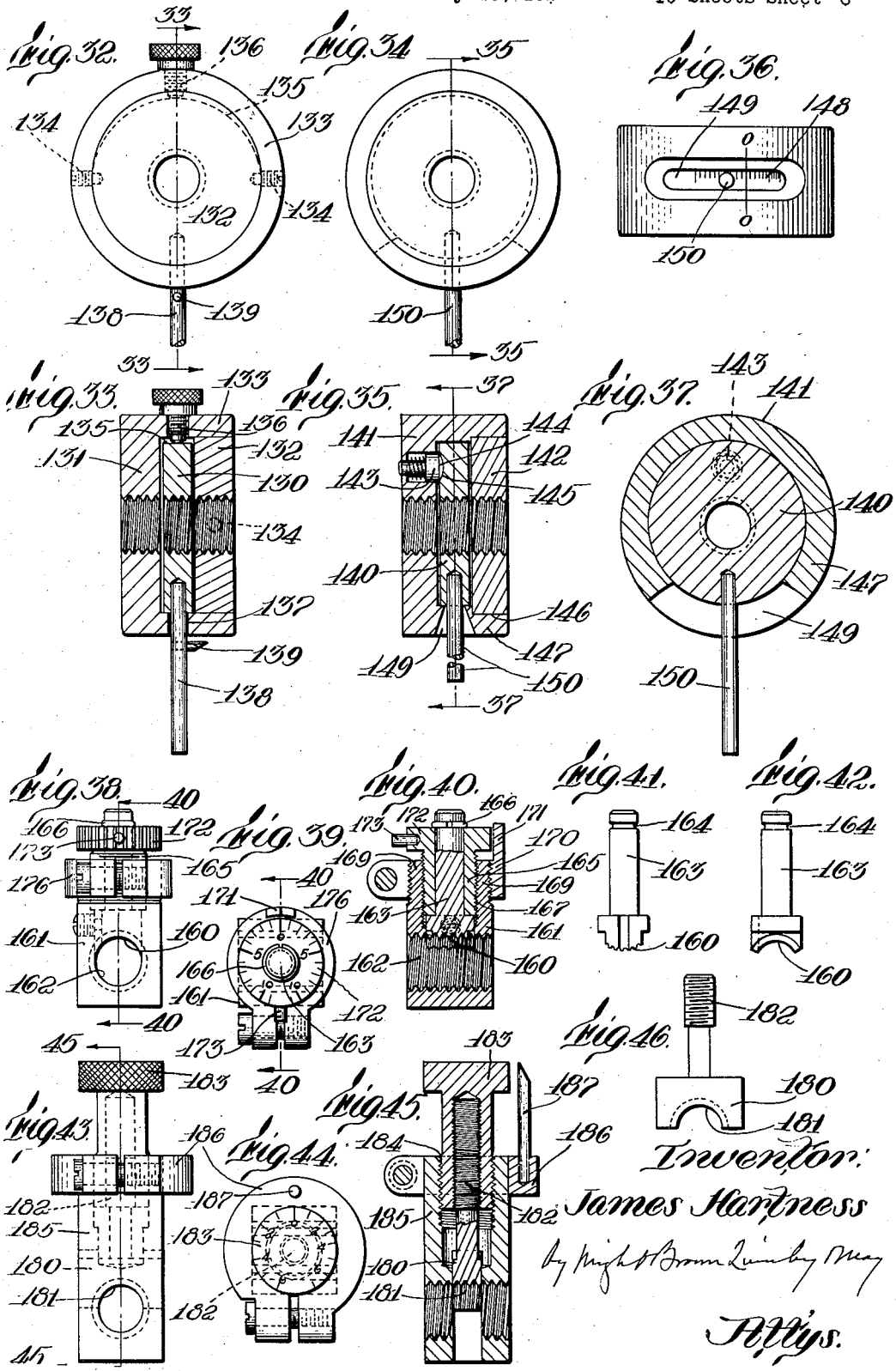

Nov. 3, 1931.  J. HARTNESS  1,829,797
THREAD GAUGING
Filed May 18, 1927   10 Sheets-Sheet 7
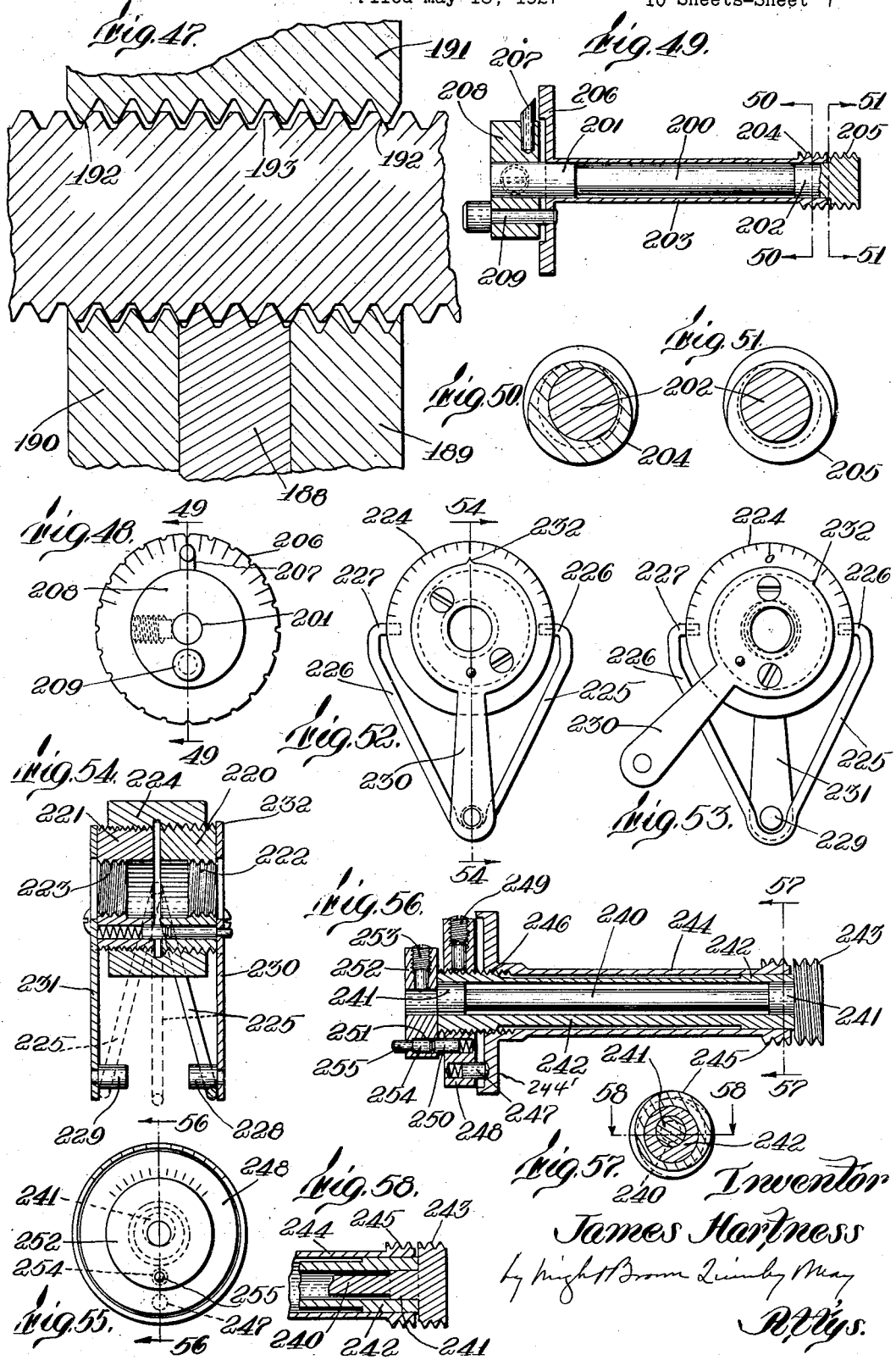

Nov. 3, 1931. J. HARTNESS 1,829,797
THREAD GAUGING
Filed May 18, 1927 10 Sheets-Sheet 8
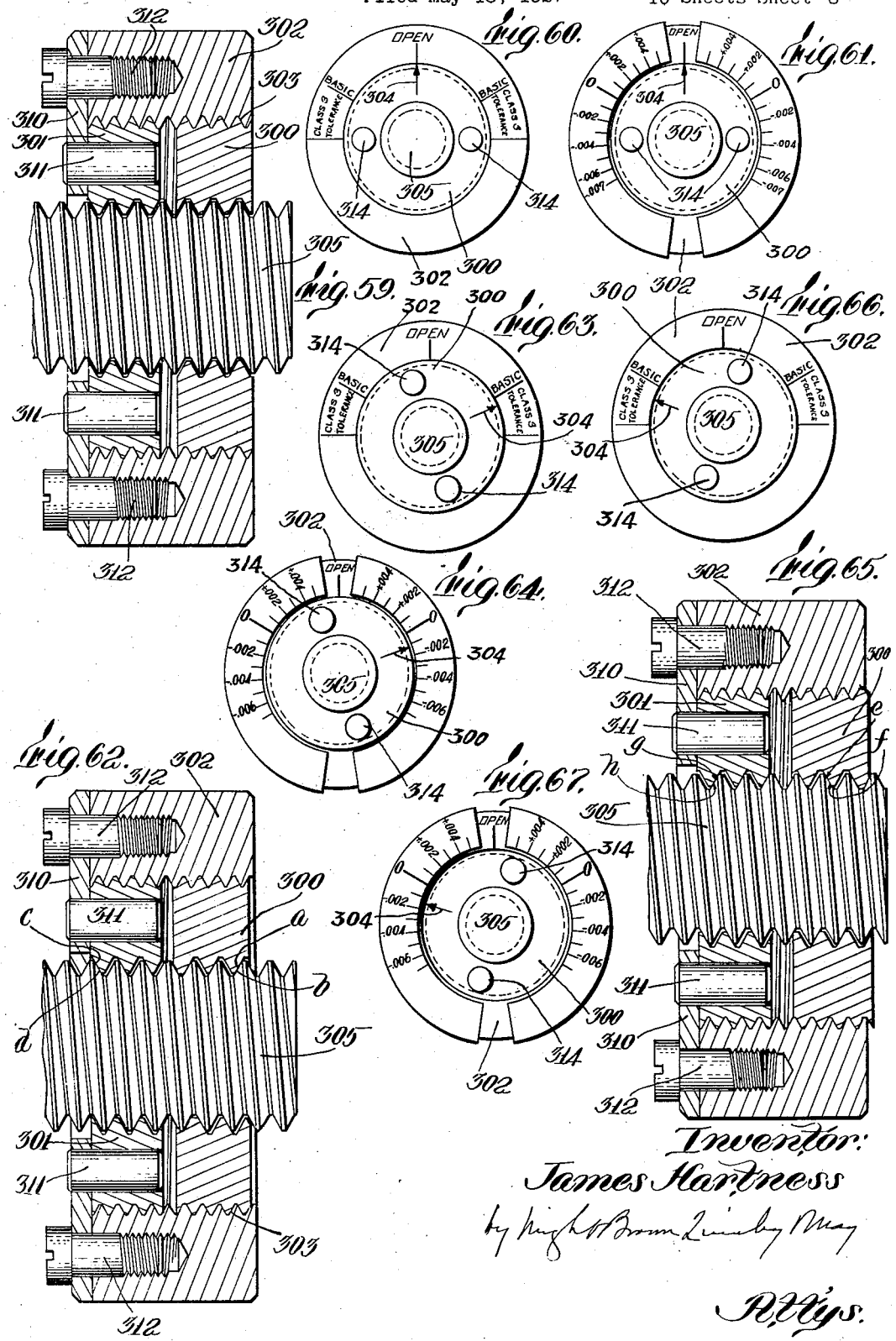

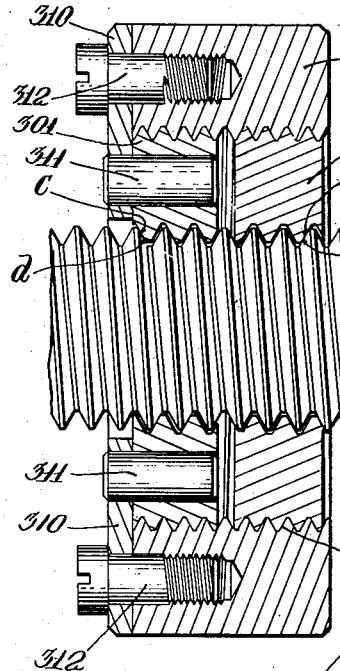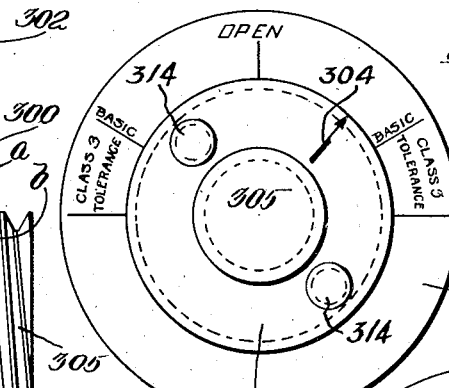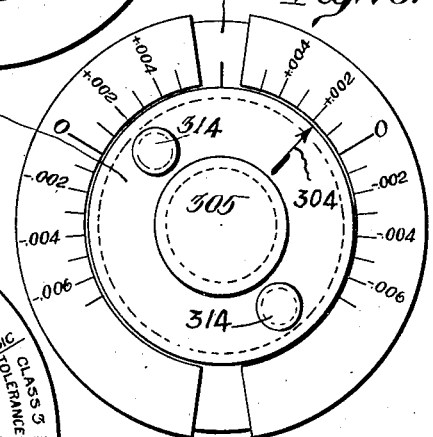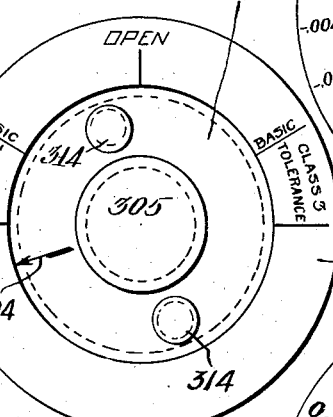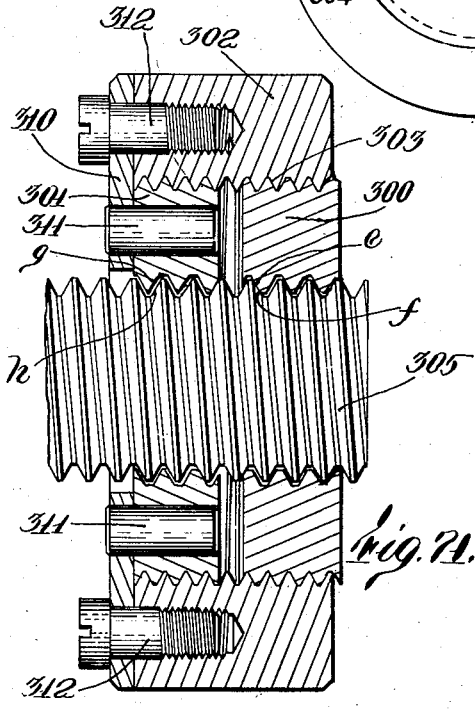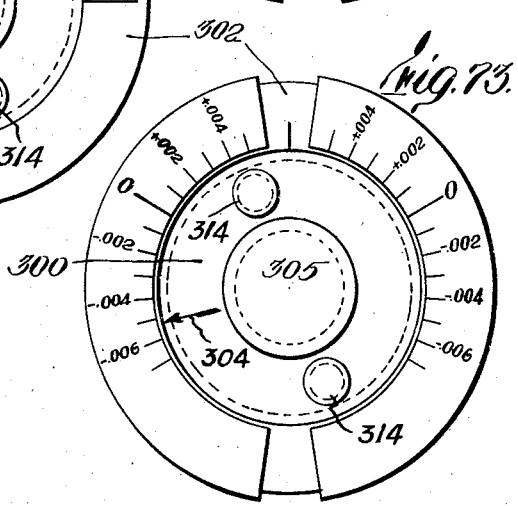

Nov. 3, 1931.  J. HARTNESS  1,829,797
THREAD GAUGING
Filed May 18, 1927   10 Sheets-Sheet 10
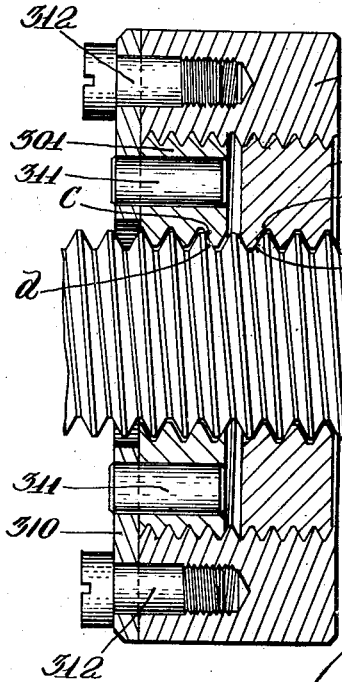
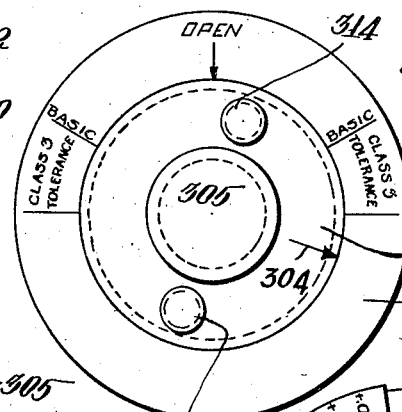
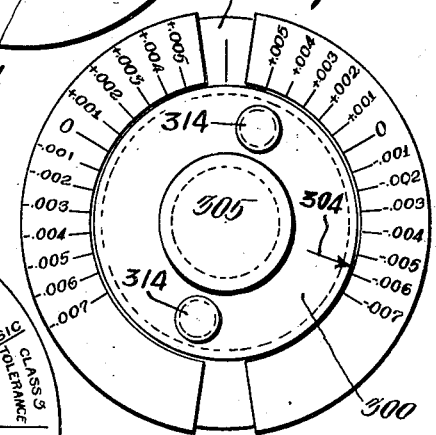
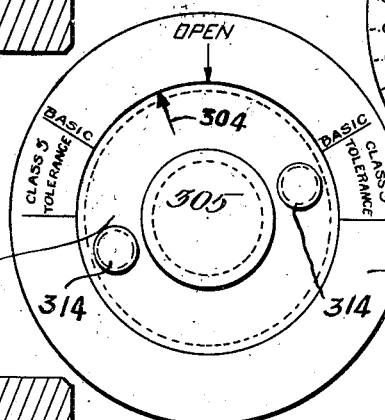
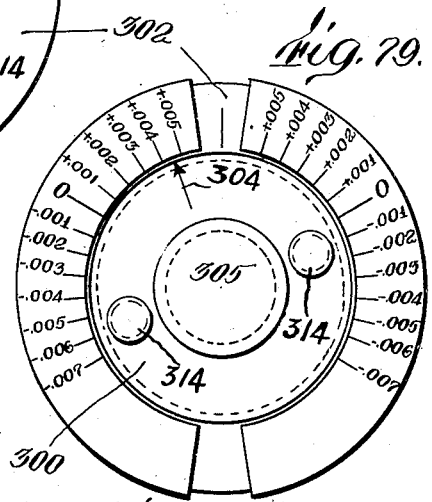
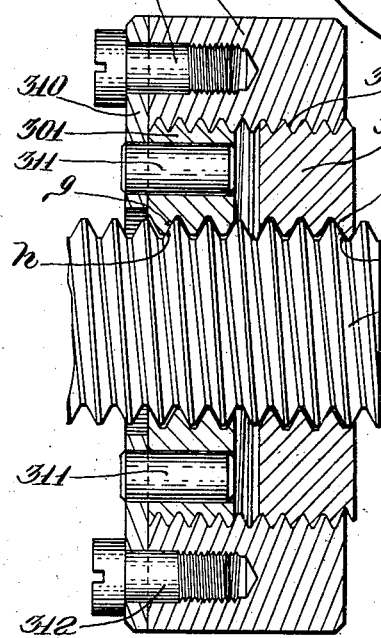
Inventor:
James Hartness Patented Nov. 3, 1931

1,829,797

UNITED STATES PATENT OFFICE

JAMES HARTNESS, OF SPRINGFIELD, VERMONT

THREAD GAUGING

Application filed May 18, 1927. Serial No. 192,236.

One of the most important phases of standardization of screw thread products is that of interchangeability, so that the products made in different parts of a manufacturing plant or in different manufacturing plants at a distance from each other may be assembled without difficulty and in a dependable manner.

In order that such interchangeability may be secured it is necessary that several elements be taken into account, none of which may be varied beyond predetermined limits for a certain class of fit. Important among these elements are major diameter, pitch diameter, minor diameter, angle of thread, and pitch or lead. A variation in any one of these elements of a screw thread from a fixed standard for any size will prevent a perfect fit.

Heretofore the suitability of threaded parts for interchangeability within a given class of fit has been tested by the use of various forms of gauges termed "Go" and "Not go." If the threaded member will be acceptable by the "Go" gauge and unacceptable by the "Not go" gauge it has been passed as sufficiently accurate. This condition, however, does not necessarily signify that each of the various elements, for which there are tolerance limits is actually within such limits, since variation in one may, to a greater or less extent, offset variation in another. For example, an excessively long or short lead in a screw will give an effect of increased pitch diameter in the closeness of engagement of the screw in a standard nut and in some types of "Go" gauge.

Another deficiency of the "Go" and "Not go" gauges is the fact that if the threaded work is accepted by the "Go" gauge and refused by the "Not go" gauge there is nothing to indicate how near the work is to being refused by the "Go" gauge and accepted by the "Not go" gauge; that is, how near its dimensions are to the standard. It is desirable, however, to determine a position between the upper and lower tolerance limits which permits the widest departures therefrom without causing rejection of the work and which, when the thread forming machine is once adjusted to it, will permit the machine to run longest without overrunning the boundaries of tolerance.

According to the present invention, therefore, gauging means are provided by which the nearness to this desirable position within the tolerance range of certain important elements or dimensions may be determined in an expeditious manner, and at the machine by which the threads are being formed, so that the machine operator may be guided as to proper adjustments of the machine to be made from time to time tending to correct the departures in either direction of such elements, or dimensions, from such mid-tolerance positions so that such departures may be maintained at all times within the tolerance limits. More specifically gauges by which departures from pitch diameters and lead of standard threads may be indicated will be hereinafter disclosed and claimed.

Snap and ring gauges for outside work and plug gauges for inside work, as heretofore constructed, have been subject to abrasion and wear which makes it necessary to establish tolerance boundaries for such gauges. The gauges of the present invention are opening and closing gauges designed to compare taps, screws and other threaded parts directly with a standard plug gauge, eliminating the need of the usual intermediate gauges and loss of size of gauges having more or less fixed adjustments due to wear of use. The fact that these gauges are open and closing gauges prevents wear thereon when the work is inserted or removed and they may be compared frequently with an inspector's gauge or even the standard gauge, if desired, without appreciable wear on those gauges. The plug gauge is the only member of the screw family which can be made with great accuracy and it alone is thus suitable for use as the foundation of all thread measurements including both external and internal threads. The gauges of the present invention, also, close with stress on the threads to be tested thus tending to even out surface inequalities throughout practically the entire thread circumference and they equalize inequalities in substantially the same manner as when the thread is in service.

In general, each of these gauges comprises a plurality of threaded members engageable with standard threads with a relatively loose fit, and so carried or mounted that their threads are capable of measured relative motions into pressing engagement with the threads of the standard threaded member and of those members to be tested, variations in the extent of such motions, when applied to standard threads to those to be tested, indicating in amount and direction variations of the threads to be tested from the standard threads.

Relative movement of the threaded members in opposite directions axially to bring the side faces of their threads into contact with opposite side faces of the standard thread gives, by the extent of such relative movement, an indication of the flank thickness of the standard thread, and variations in the extent of such movement required to bring the side faces of the threads of these members into contact with the opposite side faces of the threads to be tested indicate variations in flank thickness of the threads to be tested from those of the standard thread. Flank thickness (i. e. the thickness of a thread from flank to flank measured at the pitch line) is a true measure of the strength of the thread and heretofore has been arrived at indirectly by measurement of pitch diameter which is a definite function only of flank thickness, depending on the angle of the thread faces. With the usual angle of 60° variations of pitch diameter cause .577 of those amounts in corresponding variations of flank thickness at the pitch line.

As measurement of pitch diameter as heretofore practiced is made at single points only it may give a local measurement only which may not truly indicate the strength of the thread in service where the bearing of the mating thread thereon is over an extended area. Such measurements are reliable only when made on especially prepared smooth threads and are not suitable for testing the relatively rough surfaced threads produced by the usual thread forming machines. The contact between the threads of the gauge members of the present invention and the threads to be tested is similar to that which the threads to be tested have with their mating threads in service, except that it does no extend so far toward the thread roots due to the slight difference in size of the threads of the gauge members from that of the work with which the threads to be tested are intended to engage.

Differences in permissible axial movement between the two gauge members when applied to standard threads and threads to be tested represent differences in relative position of the corresponding faces of the threads of the standard and test pieces. If there is no lead error of the test piece the difference between the permissible movement when the gauge is applied to the standard thread and when applied to the test thread is the same whether the gauge pieces are turned in one or the opposite direction relative to each other. If there is a lead error these permissible movements will be unequal for these opposite movements of the gauge members, the extent of this inequality indicating the extent of lead error. These gauges thus may indicate lead error as well as flank thickness or pitch diameter error.

The threaded members of my gauge may, if desired, be permitted a relative movement transverse to the thread axis, the extent of such movement permitted by the specimen tested giving a direct indication of the pitch diameter. Where the pitch diameters of the threaded gauge elements do not differ too widely from that of the specimen so that the helix angles are not greatly different, a more extensive area of engagement is produced on those portions of the thread surface most effective in taking stress, than in the case of measuring devices for the same purpose heretofore used in so far as I am aware. As will more fully appear also, the same members may be mounted to permit relative movements both axially and transversely.

For a more complete understanding of this invention, reference may be had to the accompanying drawings illustrating various embodiments of my invention and in which Figure 1 is a section through a gauge for measuring flank thickness of external threads, this section being taken on the line 1—1 of Figure 2.

Figure 7 is a section on line 7—7 of Figure 8, showing a somewhat modified construction also using a differential thread.

Figure 8 is an elevation showing a somewhat modified construction.

Figures 9 and 10 are sectional views of certain parts of the same construction.

Figure 11 is a section on the line 11—11 of Figure 12.

Figure 12 is an elevation of a further modification.

Figure 13 is a detail section on line 13—13 of Figure 12.

Figures 14 and 15 are plan views illustrating scale plates for indicating tolerances for different classes of fit.

Figure 16 illustrates a scale plate in which the variations from standard are indicated by percentages.

Figures 17 and 18 are opposite face views of a still different construction.

Figure 19 is a section on line 19—19 of Figures 17 and 18.

Figure 20 is an elevation illustrating a further modification.

Figure 21 is a section on line 21—21 of Figure 20.

Figure 27 is an elevation of a gauge for testing pitch diameters.

Figure 28 is a section on line 28—28 of Figure 27.

Figure 29 is a detail of one of the parts shown in Figures 27 and 28.

Figure 30 is an elevation showing a modified construction.

Figure 31 is a section on line 31—31 of Figure 30.

Figure 32 is an elevation showing a further modification.

Figure 33 is a section on line 33—33 of Figure 32.

Figures 34 and 35 are views similar to Figures 32 and 33, but showing further modifications.

Figure 36 is an edge view of the construction shown in Figures 34 and 35.

Figure 37 is a section on line 37—37 of Figure 35.

Figures 38 and 39 are elevations showing a different construction.

Figure 40 is a section on line 40—40 of Figures 38 and 39.

Figures 41 and 42 are detail elevations of a part shown in Figures 38 to 40.

Figures 43 and 44 are elevations showing a different construction using a differential thread.

Figure 45 is a section on line 45—45 of Figure 43.

Figure 46 is a detail elevation.

Figure 47 is a diagrammatic section illustrating the effect of lead error in connection with the construction of Figures 27 to 46.

Figure 48 is an end elevation of a gauge for testing pitch diameters of internal threads.

Figure 49 is a section on line 49—49 of Figure 48.

Figures 50 and 51 are sections on lines 50—50 and 51—51, respectively, of Figure 49.

Figures 52 and 53 are elevations showing parts in different positions of a gauge construction to test both flank thickness and pitch diameter.

Figure 54 is a section on line 54—54 of Figure 52.

Figure 55 is an end elevation of a gauge for internal threads having combined action.

Figure 56 is a section on line 56—56 of Figure 55.

Figure 56a is a sectional view similar to Figure 56 but showing a slightly different structure.

Figures 57 and 58 are sections on lines 57—57 and 58—58, respectively, of Figures 56 and 57.

Figures 5, 6:
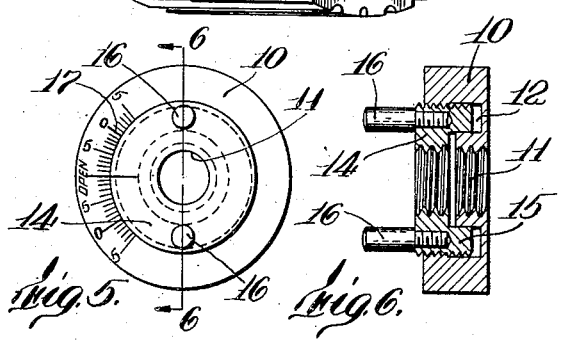
Figure 5 is an elevation showing a modified construction using a differential thread.
Figure 6 is a section on line 6—6 of Figure 5.
Figure 22:
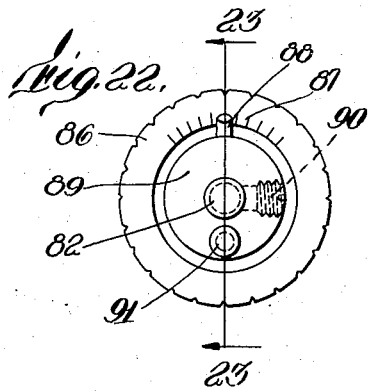
Figure 22 is an end view of a gauge for testing internal threads.
Figure 23:
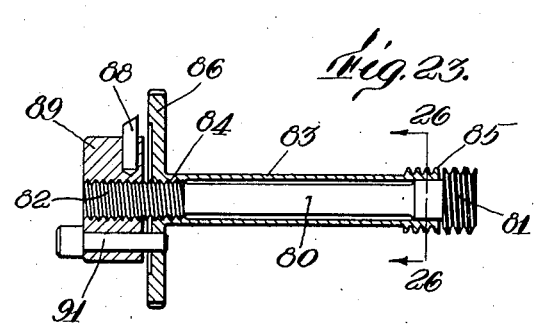
Figure 23 is a section on line 23—23 of Figure 22.
Figure 24:
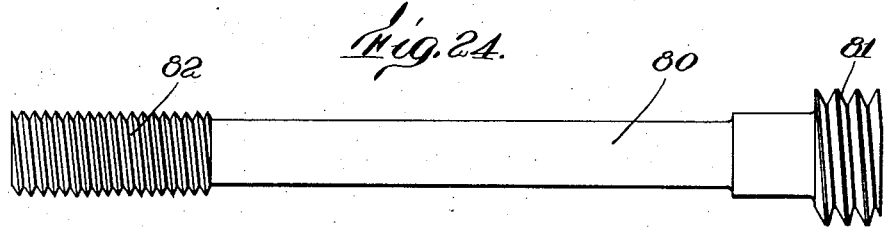
Figures 24 and 25 are details, Figure 25 being in section, of parts of the construction illustrated in Figures 22 and 23.
Figure 25:
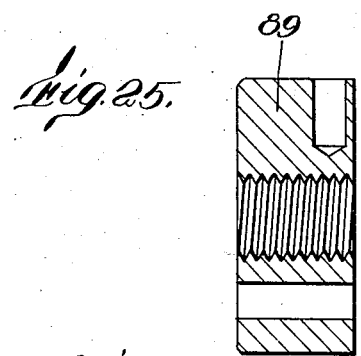
Figure 26:
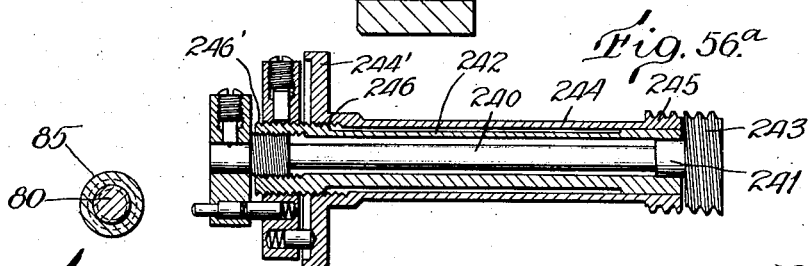
Figure 26 is a section on line 26—26 of Figure 23.

Figure 59 is a central cross section through a gauge somewhat similar to the gauge shown in Figures 5 and 6, the gauge members in this figure being in open position and showing a screw of a size within the tolerance limits and of proper lead positioned therein.

Figures 60 and 61 are end elevations showing corresponding positions of the indicator elements, Figure 60 showing tolerance limit markings, while Figure 61 shows graduations in pitch diameter difference.

Figures 62 and 65 are each similar to Figure 59 but showing the gauge members relatively adjusted to opposite closing limits, respectively.

Figures 63 and 64 are similar to Figures 60 and 61, respectively, but showing the parts in similar position to Figure 62.

Figures 66 and 67 are views similar to Figures 60 and 61, respectively, but with the parts in the adjusted position of Figure 65.

Figures 68 to 73, inclusive, are views similar to Figures 62 to 67, respectively, but show the gauge members applied to a screw of short lead.

Figures 74 to 79 inclusive are views similar to Figures 62 to 67, respectively, but showing the gauge members as applied to a screw of long lead.

Referring first to the construction shown in Figures 1 to 4, which illustrate a gauge for testing external threads, 1 and 2 indicate cooperating internally threaded members, each of these members being provided with internal gauging threads of the same lead as the standard external threads of the size to be tested and of a pitch diameter at least as great as the maximum tolerance limit for the class of fit desired. The member 1 is shown as provided for slightly more than half its circumference with a marginal flange 3 provided with an overhanging lip 4, this lip forming with the inner face of the member 1 a socket to receive the member 2, permitting the member 2 to be rotated relative to the member 1, but preventing it from axial movement relative thereto. In order that the member 2 may be inserted in and removed from this socket, opposite diametrical portions may be flattened off as shown at 5 and 6 sufficiently to decrease the over-all dimensions of the member 2 at this diameter so as to pass between the nearest marginal edges 7 and 8 of the flange portion 3. These flattened off portions are arranged at such an angular relation to the internal threads of the member 2 that when one of these, such as the portion 5, is positioned half way between the edges 7 and 8, the internal or gaging threads of the members 2 and 1 lie in a common helix. When the members 1 and 2 are in this angular relation the gauge is in its open condition and a threaded member, either standard or to be tested, may be screwed freely thereinto, the threads in this condition making a sufficiently loose fit with the standard threads as to permit threads of the maximum tolerance dimensions to be inserted. The angular position of the members 1 and 2 when in this open position may be indicated by a suitable mark on the exposed face of the member 2 registering with a mark on the adjacent surface portion of the lip 4.

Assume now that a standard threaded plug of the proper size be screwed into the parts 1 and 2 of this gauge, these parts being in their open position. By relative rotation their internal threads may be moved out of a common helix until the threads of the two members bind against the threads of the standard plug. The reason for this will be evident when it is considered that with the plug held from rotation the member 2 acting as a nut thereon will tend to displace the plug axially in one or the other direction, depending on the direction of rotation of the member 2. Such axial displacement can be effected only until one side or the other of the sides of the plug thread—which, depending on the direction of rotation of the member 2 and the consequent direction of motion of the plug,—impinges on the corresponding side of the threads in the member 1. In other words, relative rotation between the members 1 and 2 causes an apparent travel of their threads toward or from each other even though there is no relative bodily axial movement of the members themselves. When the members are in threaded engagement with a screw, such apparent relative movement of the threads of the two members necessarily results in an eventual binding of these threads on opposite flanks of the screw thread with which the members are engaged. The extent of turning in either direction, therefore, represents the position of the side faces of the threads in the plug, the limit of rotation of the member 2 in one direction representing the position of one side face, and the limit of rotation of the member 2 in the opposite direction representing the position of the other face of the thread with reference to the axial relation of the plug in the member 1.

If now a plug having threads thereon which are not standard but which are to be tested is substituted for the standard plug and the member 2 is rotated in opposite directions as far as is permitted, the extent of such rotation furnishes an indication of the position of the corresponding side faces of the threads to be tested. If the extent of turning is more than that permitted when the standard plug is in position, it will indicate that the flanks of the threads tested are thinner at the standard pitch line than those of the standard, while if the extent of motion permitted is less than in the case of the standard thread flanks, indication that the threads are thicker than standard is given. If the difference in the extent of turning permitted for the threads to be tested and the standard threads is unequal in opposite directions, it means that the threads being tested are positioned differently from those of the standard, this indicating a lead error in the threads being tested.

As workmen are at present accustomed to use variations in pitch diameter as an indication of thread differences, the scale on the member 2 may be correspondingly graduated in pitch diameter differences. The measuring of flank thickness directly, however, is more liable to be accurate than the measuring of pitch diameter for the reason that the thread faces may be quite inaccurate so that pitch diameter may not give an accurate indication of thread strength.

Figure 1:
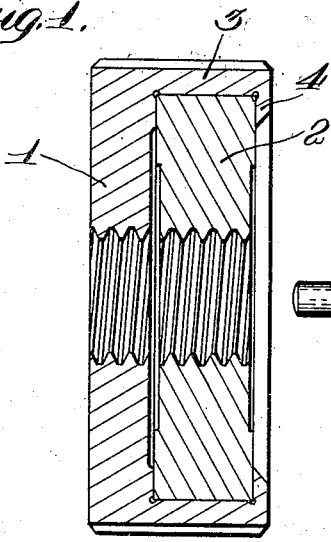
Figure 2:
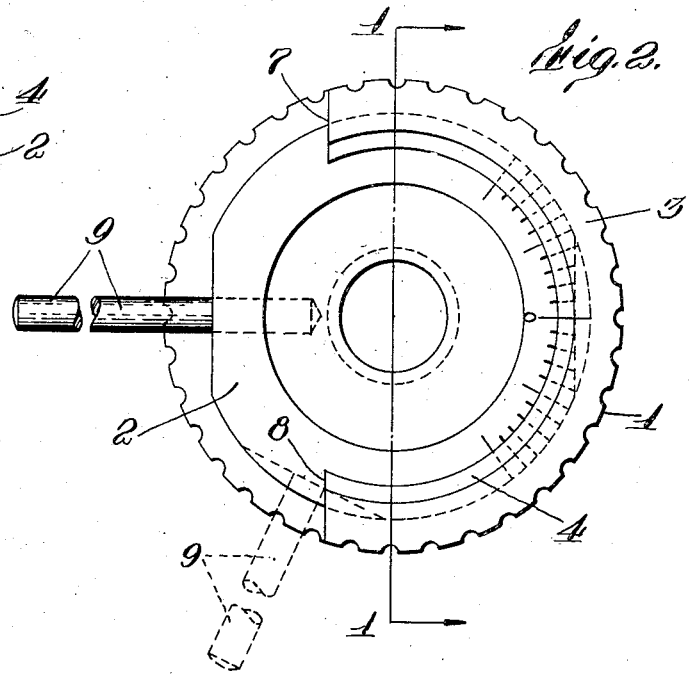
Figure 2 is an elevation of the gauge shown in Figure 1.
Figure 3:
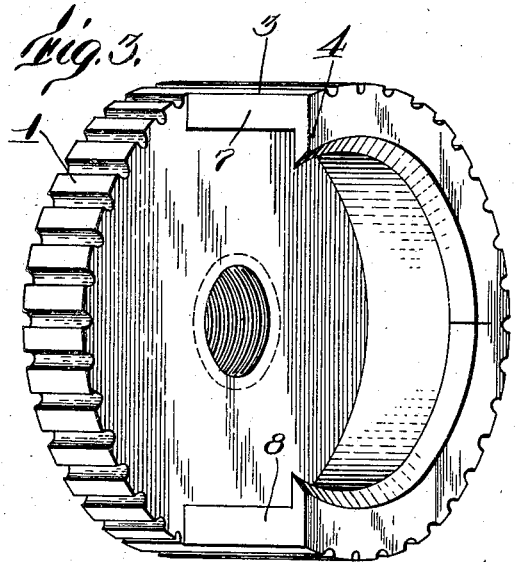
Figures 3 and 4 are perspectives showing the internally threaded portions detached.
Figure 4:
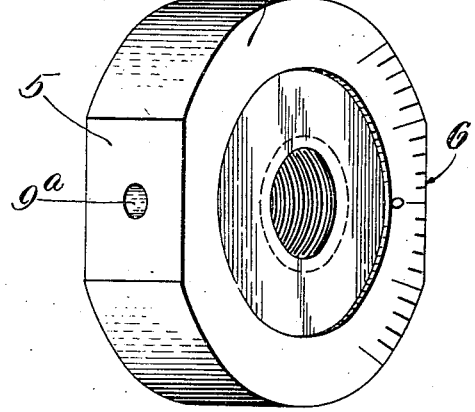

As shown in Figure 2, a pin 9 may be fixed in a radial perforation 9a in the member 2, this pin serving as a handle by which the member 2 may be turned and likewise preventing the member from being turned to an extent sufficient to permit it being removed from its socket in the member 1. As shown also in Figures 2 and 3 the outer edge of the member 1 may be grooved, roughened, or otherwise formed so that it may be securely grasped.

Due to the binding action of the threads of the members 1 and 2 on the specimen being tested, the surface inequalities of the threads of this member are pressed down, thus giving a thread measurement of threads in a condition somewhat comparable to that when in service. The engagement of the gauge members on the threads is over an extended area and over those portions of the thread which take the major portion of the stresses in service, the greatest difference being that due to the fact that as the threads of the gauge element are oversize and loosely fit the threads of the specimen they do not reach so far toward the roots of the threads tested as would the threads in a hole of the best size to receive these threads.

I do not herein claim specifically the structure shown in Figures 1–4 of the drawings, nor the specific method of gauging inherent in the use of this particular form of gauge as described, such subject matter being set forth and claimed in my copending application Serial No. 234,116 filed November 18, 1927.

It will be noted, in the construction just described that no relative axial motion bodily is permitted between the members 1 and 2, although the rotation of one of the gauge elements first in one direction and then in the other has the effect of causing the threads thereon to advance or push axially first against the flanks on one side of the thread being tested and then against the flanks on the other side thereof. If now such bodily axial motion be permitted but so controlled that the threads may lie in a common helix at one angular position only, a proportional increase of the angular motion with a consequent magnification in indication over that of the construction just described may be effected. A gauge in which use is made of this action is illustrated in Figures 5 and 6 and somewhat diagrammatically in Figures 59 to 79. Referring to Figures 5 and 6, 10 indicates one of the threaded members internally threaded at 11 to form gauging threads and provided with an internally threaded annular socket 12 surrounding the threaded portion 11. The threads in this internal socket are of a lead different from that of the threads 11 and mate with corresponding threads in a second member 14 having internal gauging threads similar to those at 11. As shown this member 14 is provided with a marginal axially extending flange 15 which is externally threaded to mate the internal threads of the socket 12. This member 14 is shown as provided with a pair of outwardly extending pins 16 by which it may be rotated relative to the member 10.

By rotation of the member 14 relative to the member 10 an axial motion between these members is produced, but as the lead of the mating threads between these members is different from that of their internal gauging threads, these threads are differential and there is one relative angular position only within the limits of gauging motion where the internal threads of the two members lie in a common helix. As a matter of convenience the threaded engagement between the members 10 and 14 is made with a lead somewhat smaller than that of the internal gauging threads, and the confronting faces of the members 10 and 14 are somewhat spaced apart, as shown in Figure 6, when in that angular relation wherein the internal gauging threads lie in a common helix. If the members are relatively rotated from this position, the actual bodily movement of the members toward or from each other will be more than offset by the apparent relative movements of their inner gauging threads by reason of the relatively greater pitch of the latter compared with the thread connecting the members, so that relative rotation of the members in a manner to cause actual separating movement between them results in apparent mutual approaching movement between their inner threads, and vice versa. With this construction the member 14 may be rotated in either direction relative to the member 10 to bring the internal gauging threads into binding engagement with the external threads of the standard plug or of the work to be tested, the confronting end faces of the two members approaching or receding from each other depending on the relative direction of rotation. As shown in Figure 5, the member 14 has an index indicated thereon which comes opposite to a zero indication on a scale 17 on the adjacent face of the member 10 when the gage is set to basic size of the plug, there being one such position when the gauge members are turned in either direction away from open position where the gauging threads lie in a common helix. At either side of these zero points on the scale 17 are indications to which the zero mark on the member 14 may be brought as the member 14 is rotated in opposite directions as far as is permitted by the work in the gauge, and as the member 14 moves axially during its rotation but at a less rate than the pitch of the gauging threads it may be given a more extensive angular movement for the same piece of work than can be given the member 2 of the form first described which is not permitted any bodily axial movement. Provision of the socket 12 permits the gauging threads of the two portions to be positioned closely together while permitting a desirable length of thread engagement between the parts 10 and 14, even when the member 14 is screwed outwardly from the member 10 to a considerable extent.

In order that the action of the gauge members when a differential thread is employed may be more fully appreciated, certain more or less diagrammatic showings of a gauge constructed somewhat similar to that shown in Figures 5 and 6 have been shown in Figures 59 to 79. Referring to these figures, it will be seen that the gauge comprises a pair of ring gauge members 300 and 301, one of these members, as 301, being fixed to a ring 302 which has an internally threaded portion 303 with which external threads on the member 300 engage. As shown, the fixing of the member 301 is accomplished by the use of a ring 310 pinned thereto by pins 311, the ring 310 being fixed as by screws 312 to the ring 302. Pins 314 projecting beyond the outer face of the ring 300 may be engaged by the fingers to facilitate turning of the member 300. The threads at 303 are shown as of less pitch than the gauging threads of the members 300 and 301. When the member 300 is in such angular position that its outer face is flush with the corresponding face of the ring 302, its gaging threads lie in the same helix with the gauging threads of the member 301 and a mark or arrow 304 on the member 300 points to the open position marking on the ring 302, as shown in Figures 60 and 61. In Figure 60 the ring 302 carries tolerance limit indications on either side of the open position, while in Figure 61 the end face of the ring 302 is provided with graduations showing pitch diameter differences in thousandths of an inch. Ordinarily for common shop use the gauge is provided with indications to show the tolerance limits or bounds of tolerance, since the specimen being tested is accepted when, on being subjected to the gauging operation, the indicator or mark 304 stops on each rotative movement of the element 301 between the marks indicating the bounds of tolerance.

When the arrow 304 is brought opposite to the open position indication on the ring 302 so that the gauging threads of both gauging members lie in a common helix, the gauge is in its open position so that it will admit the screw 305 with a loose fit, as shown in Figure 59. If now the member 300 be rotated clockwise when viewing the gauge from the end face bearing the indications, the arrow 304 may be brought within the tolerance limits into the position shown in Figure 63. When in this position the member 300 has been screwed inwardly so that it takes the position shown in Figure 62, its end face being somewhat to the left of the end face of the member 302. In this figure it will be noted that the right hand faces of the gauging threads of the member 300 as at $a$ are brought up snugly against the left hand faces $b$ of the threads being gauged, while the left hand faces $c$ of the gauging threads of the member 301 engage snugly against the right hand faces $d$ of the corresponding threads of the screw 305. If now the member 300 is rotated counter-clockwise as far as it is permitted with the screw 305 in position, the arrow 304 may be moved past the open position to the position shown in Figures 66 and 67. Here also the arrows lie within the tolerance limits, their limit of motion being the same distance to the left hand side of the open position as their opposite limits of motion were to the right of this open position. This indicates a correct lead for this screw. When in this position the end face of the member 300 is somewhat to the right of the end face of the ring 302, as shown in Figure 65 and the left hand faces $e$ of the gauging threads of the member 300 engage the right hand faces $f$ of the threads being measured, while the right hand faces $g$ of the gauging threads of the member 301 are brought up against the left hand faces $h$ of the screw 305. Only one face of the gauging threads of each gauging member is in contact with the mating thread face of the screw 305 at any time.

Assume now that instead of the screw of the correct lead, a screw of short lead be placed in the gauge members when they have been turned to sufficiently near open position to receive the screw readily. The member 300 is now turned clockwise until the right hand face $a$ of the gauging threads of the member 300 engages the left hand face $b$ of the thread being tested and the left hand face $c$ of the member 301 is brought against the right hand face $d$ of the thread being gauged, the arrow 304 taking the position shown in Figures 69 and 70. As shown, this is between the tolerance limit space and the open position, and indicates either an oversize pitch diameter, or the presence of lead error, or both.

If now the member 300 be turned in the opposite direction as far as possible until its left hand face $e$ engages the right hand faces $f$ of the screw and the right hand face $g$ of the member 301 is brought against the left hand face $h$ of the screw, the arrow 304 is brought a considerable distance further from the open position in counter-clockwise direction than it was in a clockwise direction when the gauge member 300 was turned in that direction. This means that the gauge member 300 can move further inwardly than it can move outwardly until it is stopped by the threads being gauged, and that consequently these threads are closer together than the pitch of the gauging members, or in other words, that the lead is in error, being too short. If the arrow 304 moves to the left beyond the basis mark, as in Figure 72, or beyond the zero mark, as in Figure 73, this shows that the pitch diameter is actually undersize.

It is obvious that when there is no lead error present in the thread of the screw 305, the threads of the gauge members 300 and 301 when set up on the screw will engage the screw along their entire length. That is, every convolution of the threads of these members will engage the thread of the screw 305 as shown in Figure 62. When however the screw 305 has a lead error, then the threads of the members 300 and 301, having correct lead, can each engage the thread of the screw over a small portion of one convolution only (provided the lead error is not so excessive as to cause the screw to engage each member 300, 301 at two points). As shown in Figures 68 and 71, these single points of contact of each member 300, 301 with the thread of the screw 305 will be at their outermost convolutions when the members are set up in one direction (Fig. 68), and at their innermost convolutions when the members are set up in the other direction (Fig. 71). Assuming that the thread of the screw 305 is of reasonably regular and symmetrical profile, the flank thickness of a screw with a short lead may be obtained by turning the member 300 to the left as in Figures 72 and 73 since this results in engagement of two successive turns of the thread of the screw 305, the other turns not being touched by the members 300, 301. As the lead error between two successive turns of a thread is negligible, a fairly accurate indication of flank thickness of the thread is thus obtainable by rotation of the member 300 to the left. On the other hand, where the screw thread lead is short, rotation of the member 300 to the right (as in Figs. 68, 69 and 70) will cause engagement of the screw by the members 300, 301 at the outermost or most widely separated turns of the latter (Fig. 68). Thus the effect of the lead error over a distance of several turns of thread will appear when the member is turned to the right (Figs. 69, 70), this offset being modified to some extent by any error of flank thickness which may be present in the screw 305.

Assume now that a screw having too long a lead is inserted in the gauge, the gauge being brought sufficiently near its open position for this to be inserted and the gauge member 300 is turned first in clockwise direction and then in counter-clockwise direction as far as is permitted by the screw in the gauge, the condition illustrated in Figures 74 to 79 will occur. When the member 300 is turned clockwise so that the right hand gauging thread face $a$ engages the left hand thread face $b$ of the screw being tested and the left hand face $c$ of the member 301 engages the right hand face $d$ of the screw, the arrow 304 is brought to the positions shown in Figures 75 and 76, while when the member 300 is turned counter-clockwise so that its end face projected beyond the end face of the member 302, as shown in Figure 77, until its left hand thread face $e$ engages the right hand thread face $f$ of the screw and the right hand face $g$ of the member 301 engages the left hand face $h$ of the screw, the arrow 304 is brought to the position shown in Figures 78 and 79. As the lead here is long, the member 300 may be screwed in or clockwise from the gauge open position further than it can be screwed out, this being shown by differences in the angular position of the arrow 304 from the open position when turned in these directions. As shown the arrow 304 when turned clockwise goes beyond the range of tolerance limits as shown in Figure 75, or to between 5/1000 and 6/1000 of an inch small pitch diameter as shown in Figure 76, while when turned in the counter-clockwise direction it does not reach the tolerance limit range, showing between 4/1000 and 5/1000 of an inch oversize in pitch diameter. This inequality of permissible movement of the gauge member 300 in opposite directions indicates a lead error and that the lead is long. As hereinbefore stated, the presence of lead error in the thread of the screw 305 results in contact of the screw 305 at one point only with each of the members 300, 301, these two points being on either the two innermost or the two outermost turns of the threads of the members 300, 301 according to the direction in which the member 300 is rotated when the gauge is set up on the screw 305. If the lead error of the screw is long, rotation of the member 300 to the right or clockwise as in Fig. 75 results in engagement of the members 300, 301 with the screw 305 at points $b$ and $d$ (Fig. 74) which are close together. Thus the effect of the lead error in this instance is practically eliminated and the flank thickness is indicated by the angle of rotation of the member 300. On the other hand, turning the member 300 to the left (Figs. 78, 79) results in engagement at the outermost of most widely separated turns $e, g$ of the members 300, 301 (Fig. 77) so that the effect of the lead error over several turns of thread is indicated by the angle of rotation of the member 300 to the left, this indication being modified by any error of flank thickness which the screw 305 may have. In using a gauge of this type, the presence of lead error may be observed by the lack of equality between the angles of rotation of the member 300 in opposite directions from the open position. In such case, the position of greater angular displacement indicates the flank thickness of the thread being tested while the opposite position of the member 300 indicates the lead error over several turns of thread modified by the flank thickness error, if any, of one thread. As shown both in connection with the short lead of Figures 69 and 73, and in the case of the long lead in Figures 74 to 79, the screw does not come within the tolerance limits and hence must be rejected. If it does not fall within the tolerance limits when turned in either direction, it is so far from the standard size as to be rejected. When there is a lead error, it will be noted that the gauge indications do not represent true indications of pitch diameter.

It will be seen that in the use of this gauge, when the gauge members are turned relative to each other in either direction, the threads of one gauge member engage the flanks on one side only of the threads of the member being tested, while the threads of the other gauge member engage only the flanks on the other side of the threads being tested, and that by turning the gauge members relative to each other first in one direction and then in the other, the gauging threads of each member are caused to engage first on one flank and then on the opposite flank on the threads of the member being tested.

In Figures 7 to 10 a slightly modified construction is shown, in which the similar internally threaded gauging members 20 and 21 are threaded into a retaining ring 22 by threads having a lead different from that of the gauging threads. One of these members, as the member 21, may be fixed in position in the ring 22 as by means of a set screw 23, while the other may be permitted a rotary movement with relation to the ring 22 and may be held normally in its gauge-open position relative to the member 21 by means of a spring pressed pin 24 carried by the ring 22 and engaging in a depression 25 in a member 26 made fast to the outer face of the member 20 as by means of the screws 27. This member 26 may have a handle portion 28 and an indicator pointer 29 movable over a scale on the adjacent face of the ring 22, as shown best in Figure 8. The member 21 may also have fixed thereto a similar handle member 29ª to facilitate holding this member against rotation when it is desired to rotate the gauge member 20.

In Figures 11 to 13 a further modification is shown. In this construction the gauge members 30 and 31 have threaded engagement with the ring 32 by a thread having a lead different from that of the gauging threads, and these gauging members 30 and 31 are shown as of greater axial length than the gauge members 20 and 21 heretofore described and are provided with gauging threads for substantially one half the lengths of their internal bores. These members 30 and 31 may be assembled either end out, as shown their internally threaded portions being placed adjacent to each other. Each is provided with a disk face or plate portion as 33 and 34 fixed thereto as by screws 37 and provided with a handle extension 35 and 36, respectively. The plates 33 and 34 may be fixed to either face of the corresponding gauge member, being fixed to that which is positioned outwardly. On the ring 32 may be secured a two pieced ring member 40, U shaped in cross section which extends over the outer faces of the member 32 and partially masks the scale 41 which may be marked thereon. This masking portion 42 covers indications except those within the tolerance limits for any particular class of fit desired which are alone exposed. For example, as shown in Figure 12, a class 1 fit is designated, all the graduations below 3 and above 9 being masked. Either of the ring members 30 or 31 may be fixed to the ring 40 at will. For this purpose the ring 40 has diametrically opposite openings within which extend inturned ends 45 of a stirrup member 46 which may be swung so that its central part 47 engages either one of the lugs 48 on the handle portions 35 and 36 to hold the corresponding gauge member against rotation relative to the ring. The gauge members 30 and 31 may be held in their open condition with their gauging threads lying in a common helix, and for this purpose the construction shown in Figure 13 may be employed. Referring to this figure it will be seen that the members 30 and 31 have perforations 49 which are in axial alinement when the gauge members are in open position. When in this position a spring 50 in one of these perforations holds a pin 52 extending across from one of these perforations to the other. This pin may be retracted into one of these perforations by pressure exerted on a pin 53 slidable in the other perforation and having a reduced portion 54 projecting through one face of the gauge. The mating ends of the pins 52 and 53 are preferably rounded so that when the pin 52 is retracted to approximately the face of the corresponding gauge member these gauge members may be turned relative to each other.

Figures 14 and 15 illustrate different forms of scale plates, Figure 14 being somewhat similar to Figure 12 except that the masking member 40 is arranged to show the range of tolerance for class 3 fit which is smaller than for class 1 fit. In Figure 15 no masking plate is employed, but the range of tolerances for the desired class of fit is shown on a circumferential zone different from those indications without the desired range.

Figure 16 illustrates a scale calibrated to show the percentage of normal flank thickness rather than in pitch diameter variations. The calibration of the scale to read in terms of percentages of the normal flank thickness of the screw to be tested has certain advantages over a scale calibrated in terms of fractions of an inch or other definite unit of length. The holding strength of a screw (or the shearing strength of its thread) depends to a large extent on the flank thickness of its thread so that deviations from normal flank thickness result in approximately proportional reductions in holding strength. An error of one thousandth of an inch may be negligible in the flank thickness of a relatively large screw but may be prohibitive in the case of a smaller screw, hence the significance of an error expressed in fractions of an inch depends on the size of the screw tested. But an error of flank thickness expressed as a percentage of normal flank thickness gives at once an approximate indication of the holding strength of the screw, regardless of its size, compared to what it should be if the screw had a perfect thread.

Figures 17, 18 and 19 illustrates a gauge intended to be operated by one hand but which will not indicate lead error and which is therefore only accurate to indicate flank thickness or pitch diameter error where there is no lead error. In this construction the gauge members having the internal gauging threads are shown at 60 and 61, being engaged with a differential thread,—that is, a thread with a different lead than the gauging threads—with the marginal holding ring 62 which may be fixed to one of these gauging members, as the member 60, by means of the set screw 63. These two gauging members are normally and resiliently held in their open position with the gauging threads lying in a common helix by means of a coil spring 64 seated in mating sockets 65 in the two gauging members and having one of its ends fixed to each of these members. The ring member 62 which carries the scale on its end face may have a masking member 66 showing the required tolerance boundaries detachably fixed thereto, and each of the members 60 and 61 may have handle extensions as at 67 and 68, as shown in Figures 17 and 18. These extensions 67 and 68 may have knobs 69 at their outer ends to facilitate their engagement by the operator's fingers. In normally open position of the parts the finger portions 67 and 68 are spaced apart as shown in Figures 17 and 18. When the screw to be tested has been inserted, these finger portions may be brought together, thus turning the members 60 and 61 relatively until their gauging threads bind upon the work, thus indicating by comparison with the extent of motion permitted when a standard plug is in the gauge, variations from this standard of the threads of the piece being tested.

In Figures 20 and 21 a further modification is shown in which one of the gauging members as 70 may have a tubular handle portion 71 fixed thereto in which the threaded member to be gauged may extend. As shown the other gauge member 72 having the mating gauging threads is provided with the handle plate 73 which may be fixed to the retaining ring 74 as by means of the stirrup 75. In this construction the outwardly directed flange 76 of the tubular handle 71 is shown as formed at one point with an indicator pointer 77 which cooperates with a scale on the adjacent face of the ring member 74, which may, if desired, be partially masked by the tolerance boundary member 78.

The same principle of gauging may be applied to the measurement of internal threads and with the same degree of accuracy, a result which heretofore, so far as I am aware, has not been possible. A construction for this purpose is illustrated in Figures 22 to 26. For internal thread gauging the gauging members are provided with external threads, each of the standard lead and each of a size less than basic to the maximum tolerance, both of which may be inserted in the work and turned relatively in opposite directions to bring their thread faces into engagement with the corresponding thread faces of the internal threads. In order to procure a magnification of motion so that variations may be more readily detected, use may be made, if desired, of differential thread connection between the gauging members as shown in certain of the constructions hereinbefore described for gauging external threads. All of these constructional features are embodied in the gauge shown in Figures 22 to 26 for the gauging of internal threads.

One of the gauge members comprises a stem 80 having at one end a portion 81 of enlarged diameter in which are cut the gauging external threads. At the opposite end the stem portion is provided with external threads 82 of a different lead than the gauging threads 81, as herein shown the lead being less. This member 80 is rotatable within a sleeve 83, one end portion of the sleeve as at 84 being provided with internal threads mating the threads 82. The other end of the sleeve 83 is provided with external gauging threads 85 which cooperate with the external gauging threads 81 of the member 80 in testing the work. Adjacent to the threaded portion 84 the sleeve 83 is provided with a flanged extension 86 on the outer face of which are graduations as at 87 with which cooperates a pointer 88 carried by a head 89 fixed to the threaded end portion 82 of the member 80 as by means of a set screw 90. At one angular relation of the gauging threads 85 and 81 in which they are somewhat separated axially their threads lie in a common helix. This is the open position of the gauge at which it may be screwed into the internally threaded member to be tested or into the internally threaded member with standard threads. The parts may be normally held in this gauge-open position by means of the removable pin 91. After the gauging threads 81 and 85 are within the work the pin 91 is withdrawn and the head 89 is rotated relative to the flange 86, first in one and then in the opposite direction as far as is permitted by engagement with the gauging threads on the work to be tested. Differences of the extent of rotation permitted when the gauge is positioned within a threaded member to be tested and when positioned within a thread member having standard threads, indicates differing flank thickness of the threads to be tested from the standard threads, which as before explained, may if desired be expressed in terms of pitch diameter. Variations in amount of difference when engaged in the work to be tested and in the standard threads when rotation is effected in opposite directions indicates the presence of a lead error in the internal threads which are to be tested.

Not only may pitch diameters or flank thickness be tested by relative axial movement of a pair of threaded gauge members as has been described, but it may also be measured by a relative transverse motion between two such threaded members, and where threaded members are used for this purpose greater accuracy is ordinarily obtained than by the use of the usual snap gauges for the reason that the engagement of the gauge members with the work to be tested is over a more extended length of thread, provided however that the diameter differences of the gauge and the work to be tested are not so great as to introduce error due to the difference in lead angle for the two different diameters.

Constructions wherein such relative lateral motion of the threaded members is utilized are shown in Figures 27 to 46 inclusive. In Figures 27 to 37 this transverse motion of one of the threaded members relative to the other may be accompanied by a rotating motion about the axis of either threaded member. In the construction shown in Figures 38 to 46 no such rotary motion of the threaded member moved is permitted.

In the construction shown in Figures 27 and 28, 100 indicates the laterally movable gauge member, which as shown, is positioned between spaced internally threaded portions 101 of a block 102. The member 100 may be held in its open position relative to the member 102 with its internal threads in axial alinement with the threads of the portions 101 and in such angular relation thereto as to lie in a common helix therewith, by any suitable means, such as the spring pin 103 seated in a socket therein, the end of which may be depressed to substantially coincide with an end face of the member 100 by means of the pin 104 having a reduced extremity 105 projecting through one face of the member 102. The periphery of the member 100 is not concentric with the gauging threads, but is arranged as a cam surface at 106 (Figure 29) riding against the reduced extremity 107 of a plug 108 threaded through the member 102. The plug may be fixed in position relative to the member 102 as by means of a set screw 109. On rotation of the member 100 relative to the member 102, therefore, the bearing of the cam face 106 on the end of the plug 108 acts to force the member 100 so that its gauging threads are moved out of axial alinement with the gauging threads of the portions 101 thus to give a shearing action to the member 100 as far as is permitted by its engagement of the threads on the member to be tested. The extent of such motion permitted may be indicated by the angular position of the member 100, a scale along its edge with which a fixed line on the member 101 may cooperate showing such angular position. A shearing motion without the rotary motion may be imparted by rotation of the plug 108 and for the purpose of measuring the extent of such motion an indicator point 110 may cooperate with graduations 111 marked on the periphery of a head 112 on the outer end of the threaded plug 108.

In Figures 30 and 31 a somewhat different construction is shown in which the gauge member 120 has a cam face 121 which in use bears against the end of a plug 122 extending through a marginal wall member 123 of the other threaded gauge member 124. This marginal wall member 123, as shown in Figure 30, extends somewhat more than one half the circumference about the member 120 which may be cut off at one or more points sufficiently to permit it to be placed in position within the marginal flange 123. This flange is provided with a lip portion 125 extending over the outer face of the gauge member 120 and normally retains the member 120 in position. At the flat face portion of the member 120 may be fixed the pointer 126 which acts to prevent the member 120 being turned to such an angular position that it may be removed from the member 124 and which also acts in cooperation with graduations on a flange portion 128 of the member 124 to indicate the extent of motion permitted the gauge member 120 when a standard screw or a screw to be tested is engaged by the gauging threads of the members 120 and 124.

If it is desired to eliminate any wedging action caused by the rotation of the threaded member in either of the constructions shown in Figures 30 and 31 or 27 and 28 so that the only effective gauging motion is that transversely of the axis of the threaded member, this may be done by permitting free axial motion of the movable gauge member so that it may seat itself on the threads of the threaded member engaged thereby without reference to the changing angular relation between the gauge member and the member tested as the gauge member is given its transverse motion. This is shown in Figures 28 and 31 in which the movable gauging member is somewhat thinner than the space in which it is moved.

In Figures 32 and 33 another embodiment of the invention is illustrated in which the movable gauge member 130 is positioned between the stationary gauge members 131 and 132, the member 131 being provided with a peripheral flange 133 within which the member 132 is engaged and there fixed by means such as the set screw 134. The movable member 130 is provided with an edge cam portion as 135 which engages an abutment screw 136 threaded through the flange member 133. Opposite to this screw 136 the flange member may be provided with a slot 137 in which rides a pin 138, the inner end of which engages in an opening in the member 130. This pin 138 serves as a handle by which the member 130 may be rotated, its engagement with the screw 136 causing it to be given a motion transverse to the axis of the gauge thread openings of the members 131 and 132. This pin 138 may be provided with an index pointer 139 cooperating with a scale marked on the outer face of the flange member 133 adjacent thereto. The space within which the member 130 rotates may be made somewhat wider than the thickness of the member 130 in order to permit a free axial play to follow the lead of the screw as the member 130 is rotated, thus to prevent any motion except the transverse motion from being effective as a gauging motion.

In Figures 34 to 37 a somewhat similar construction has been shown except that the movable gauge member 140 is normally held in its open position with its gauging opening axially alined with the gauging openings of the outer gauge members 141 and 142. As shown this is accomplished by means of a spring pressed pin 143 having a rounded inner end as 144 bearing in a depression 145 in the face of the movable gauge member 140 when this member is in its gauge open position. In this construction also the gauge member 142 is seated in a portion 146 of an enlarged diameter in a marginal flange 147. The scale may be marked on the periphery of the member 140, as shown at 148 in Figure 36, and its cooperating fixed mark may be on one or both sides of the flaring slot 149 through which the handle pin 150 projects.

In Figures 38 to 42 is shown a different construction in which the movable gauge member comprises a cylindrical block 160 having its inner face curved and threaded, the threads being a portion only of a complete circumference. This block is mounted in a member 161 internally threaded as at 162 to form the gauging threads with which the gauging thread portions on the block 160 cooperate as will now be described. The block 160 is provided with a cylindrical shank 163 having an annular groove 164 adjacent to its upper end. This shank 163 is journaled in an externally threaded plug 165 and is retained in position therein by means such as the snap ring 166 engaging in the groove 164. This plug 165 is threaded in an opening 167 extending through the member 161 transversely to the axis of the threads 162. By rotation of this plug 165, therefore, it is evident that the block 160 is given a motion transverse to the axis of the gauging threads 162, the member 160 being keyed against rotation relative to the member 161 as by a screw 151 in the member 161, having a reduced end entering a longitudinal slot 152 in the member 160. The member 161 may be provided with a threaded extension 169 through which the plug 165 is threaded and on the external threads of this projection may be fixed a clamping ring 170 carrying an index finger 171 projecting across the head 172 of the plug 165. A stop pin 173 on this head may contact with opposite sides of the finger 171 as the plug is turned, thereby to limit its rotation to slightly less than a single turn. The upper face of the head 172 may be provided with suitable graduations, as shown in Figure 39, cooperating with the finger 171 to indicate the position of the gauging threads on the block 160 when the gauge is in use, thus to indicate the pitch diameter of the threads being gauged.

In Figures 43 to 46 is shown a slight modification of this construction involving the use of differential threads by which a magnification of the indication may be produced. Referring to these figures, 180 indicates the movable block rectangular in cross section and having a recess 181 provided with gauging thread portions, this block having a threaded shank 182 which engages the internal threads of the plug 183. This plug 183 is externally threaded with threads of a different lead from its internal threads as at 184 and these threads engage mating threads in the gauge member 185. By turning the plug 183 it will be seen that it not only causes axial movements of the block 180, but the plug itself also moves axially. This axial movement of the plug is in the opposite direction to that of the block 180 relative thereto, so that the total movement of the block 180 is correspondingly lessened for a given angular rotation of the plug 183. With this construction it may be necessary to permit more than a single rotation of the plug 183 to produce the desired extent of movement of the gauging member 180, and as in the construction shown in Figures 38 to 42, a clamping collar 186 may be applied to the gauging member 185, this clamping collar carrying an index finger 187 for cooperation with a scale on the upper face of the plug 183.

One of the limitations of a gauge in which the two gauging members are given a relative transverse movement and where one of these gauge members engages the work between gauging threads of the other is illustrated diagrammatically in Figure 47. Referring to this figure, the movable gauging element is shown at 188 positioned between fixed gauging elements 189 and 190 on one side of the work, these members being continuous on the other side of the thread as shown at 191. Supposing now a screw having too long a lead is placed in the gauge and the gauge member 188 is brought down by its transverse motion against the threads of the member being tested, tending to force this member bodily against the threads of the member 191 opposite thereto, the lead being too long, the outer thread faces of the screw adjacent to opposite ends of the gauge, as shown at 192, bear against the inner faces of the gauging threads and prevent the screw being tested from taking a position where the central threads 193 are in engagement with the corresponding threads of the gauge. If the lead were correct the specimen being tested would be moved bodily nearer to the member 191, under pressure of the member 188 thereon, but the excess lead bringing the teeth faces at 192 into contact prevents this motion. It will thus be seen that the member 188 can not be moved as far as it would be moved had the lead been correct and consequently an erroneous indication of the pitch diameter of the specimen is given by the transverse position of the member 188, this pitch diameter appearing to be larger than it actually is. Should the lead error of the specimen be in the opposite direction, that is the lead be too short, the opposite faces of the teeth near the ends of the gauging opening would bear against the corresponding thread faces of the member 191 which would likewise prevent the specimen from lateral movement to bring its central threads into contact with the corresponding threads of the gauge. This error would likewise thus give rise to an indication of a larger pitch diameter than actually exists.

In Figures 48 to 51 is shown a gauge construction making use of gauging members movable relative to each other by an eccentric pivotal motion and as applied to the testing of internal threads. Referring to these figures, at 200 is shown a spindle eccentrically journaled at the eccentric hubs 201 and 202 within a sleeve 203. At one end of the sleeve 203 are the external gauging threads 204 and cooperating with these threads are external gauging threads 205 on an enlarged end portion of the spindle 200. In one angular position of the spindle within the sleeve 203 the gauging threads 205 are coaxially arranged relative to the gauging threads 204 and lie in the same helical path. On rotation of the spindle 200 away from this position in either direction the gauging threads 205 are moved out of coaxial alinement with the threads 204, that is, transversely of the axis of the threads 204. The sleeve 203 is shown as provided with an outwardly extending flange portion 206 having on its outer face a scale over which rides an indicator point 207 carried by a head 208 fixed to the adjacent end of the spindle 200. The spindle and sleeve may be locked in gauge-open position,—that is, with the threads 205 coaxially arranged with the threads 204 and lying in the same helical path,—by means such as the removable pin 209. In order that the rotation of the threads 205 out of the helical path of the threads 204 may not be effective to influence the gauge reading, a sufficient amount of axial play must be permitted between the spindle 200 and the sleeve 203 to permit the threaded portion 205 to move axially as it rotates in order to seat itself between the threads of the specimen being tested. However, both the turning and transverse actions may be used simultaneously, if desired, in which case no axial movement of the spindle 200 in the sleeve 203 would be permitted.

Advantage may be taken in a single gauge of both axial and transverse movements of the gauge members relative to each other, either of these actions being made use of independently of the other. Such a construction as designed for external threads is shown in Figures 52 to 54. Referring to these figures, more particularly to Figure 54, the internally threaded gauge members 220 and 221 are provided with gauging thread portions 222 and 223. As shown in this figure, these threaded portions are arranged spaced from each other by unthreaded portions, so that they bear considerably spaced apart on the work. If desired, however, these members might be reversed so as to bring their gauge portions 222 and 223 adjacent to each other in the manner shown in Figures 11, 19 and 21, in each of which constructions also, the gauging members could be reversed to bring their gauging thread portions into spaced relation with each other as is shown in Figure 54. Such substantial spacing of the gauging threads may be utilized where a magnification of lead error is desired, the lead error over a more extended length of screw being shown. One of these gauge members, as 221, is shown as having threaded engagement with internal threads of a collar 224, these threads being shown as of shorter lead than the gauging threads, so that when the member 221 is turned its gauging threads 223 move out of the helical path in which they were positioned. The member 221, however, is externally threaded in concentric relation to the gauging threads so that this member maintains a coaxial position throughout its turning range. The gauging member 220 is threaded into the collar 224 by threads having the same lead as the gauging threads 222, but eccentrically disposed relative thereto. Thus as the member 220 is turned within the collar 224 the threads 222 would be maintained in the same helical path except that they are moved bodily laterally of the axis. Either of these members 220 and 221 may be held against rotation relative to the collar 224 while the other gauge member is permitted to have such rotation. This may be effected by means of the stirrup 225 having its inturned ends 226 and 227 journaled in diametrically opposed openings in the collar 224 so that the stirrup may be swung laterally into engagement with either one or the other of the lugs 228 and 229 carried by the handle members 230 and 231 fixed to the outer faces of the gauge members 220 and 221, respectively. Each of these handle members 230 and 231 may be provided with a scale pointer as at 232 (see Figures 52 and 53) cooperating with a scale marked on the adjacent end of the collar 224. As in constructions heretofore described, the zero mark on each scale is in the gauge open position where the gauging threads of both members lie in the same helical path and are coaxial.

In Figures 55 to 58 a gauge having the same capabilities of both relative axial and transverse movements of the gauging threads is shown, this construction being designed for gauging internal threads. These figures illustrate a gauge comprising a tubular sleeve 244 having an enlarged threaded portion 245 at one end to serve as a gauging member, and a disk-like enlargement 244' at its other end. Rotatable within the sleeve 244 is a quill 242, which is eccentrically bored to receive a pair of hub-members 241 which are connected by a spindle 240. Supported on the outer end of one of said hub-members 241 is a threaded gauging member 243. The latter is sufficiently eccentric to its hub-member 241 to offset the eccentricity of the bore of the quill 242 in which the hub-members 241 rotate, hence when the parts are in their normal positions, as illustrated in Figure 56, the gauging members 245, 243 are coaxial and their threads lie in a common helix. To facilitate manipulation of the gauge parts, a finger-piece 248 may be secured to the quill 242 as by a suitable set-screw 249, and a finger-piece 252 may be secured to the hub and cylinder member as by a set screw 253. In order to regulate the relative axial movement of the sleeve 244 and the quill 242, these members may have a threaded connection as at 246, this thread being of different and preferably smaller lead than the gauging threads of the members 243, 245. For one mode of operation of the gauge, the gauging member 243 may be locked to the quill 242 to rotate therewith, the locking means comprising some such device as a pin 250 slidable in a bore in the outer face of the finger-piece 248, the pin 250 being pressed for part of its length into an opposing bore in the finger-piece 252. In order to release the lock, a plunger 254 may be mounted in the bore in the finger-piece 252, abutting the pin 250 end to end, the plunger being provided with a reduced portion 255 which projects out from the outer face of the finger-piece 252 and may be pressed to move the pin 250 inward to release the lock. With the locking pin 250 in position, the finger-pieces 248 and 252, the quill 242, the hubs 241 and the gauging member 243 all rotate as a unit relatively to the sleeve 244 and disk 244'. When thus used the gauging action of the gauge is identical with that of the gauge illustrated in Figure 23. The gauge may be yieldingly maintained in its normal or open condition as by spring-pressed pin 247 slidable in a bore in the inner face of the finger-piece 248, a rounded end of the pin being resiliently pressed into a shallow recess in the opposed face of the disk 244'. Suitable marks to indicate angles of rotation or zones of tolerance may be made on the rim of the disk 244' as indicated in Fig. 55.

If the locking pin 250 is pushed inwardly to permit relative rotation between the finger-piece 252 and the finger-piece 248, the latter may be held with the disk 244' so that the sleeve 244 and quill 242 rotate as a unit with reference to the hub members 241. Since the gauging member 243 is eccentrically mounted on its hub member 241, and the latter is offset from the axis of the gauging member 245, rotation of the hub members will cause a transverse displacement of the member 243 relative to the member 245, this transverse effect being combined with the apparent advance of the thread of the member 243. This second mode of using the gauge is hence considerably less sensitive than the first mode described.

The transverse gauging effect may be obtained, unaugmented by an axial effect, by providing a threaded connection, as shown at 246' in Fig. 56ª, between the spindle 240 and the quill 242. The thread 246' is made with a lead equal to that of the thread of the member 243 so that when the latter is rotated relatively to the quill 242, the apparent advance of its thread is eliminated, and the gauging action is entirely due to transverse motion of the member 243.

Each of the embodiments which have heretofore been described utilize the action of a pair of threaded gauge members having the pitch diameters of their gauging threads different from the standard or basic pitch diameters in their particular sizes by an amount at least as great as the tolerance limits, in the case of the external thread gauge the pitch diameter being large and in the case of internal thread gauges the pitch diameter being small. Where taps which must exceed the standard pitch diameter are to be gauged, the pitch diameter of the gauge must be correspondingly greater so that any tap which comes within the tolerance limits for that particular size may be readily placed in the gauge when the gauge members are in open position. The term "maximum screw to be tested" as used in certain of the claims, therefore, is intended to mean in the case of the testing of external threads, a screw of the largest pitch diameter, while in the case of the testing of internal threads, a nut of the smallest pitch diameter. It will also be seen that the gauge members are given a controlled relative movement different from the lead of their gauging threads to effect their gauging actions, the possible extent of such movement when applied to a test piece as indicated by the gauge markings when compared with the corresponding indications of extent of motion permitted when a standard threaded member is in the gauge being a measure of the fit of the piece tested.

Having thus described these several embodiments of the invention, it should be evident to those skilled in the art that various other changes and modifications might be made therein without departing from the spirit or scope of the invention.

I claim:

1. A method of gauging a screw, which consists of screwing onto said screw two ring gauges which are so adjusted that the threads of each constitute a continuation of the same helix as those of the other, the threads being of a larger pitch diameter than the maximum pitch diameter tolerable in the screw to be gauged, controlling the mutual axial motion of the gauges so that it is unequal to the apparent relative advance of the threads of said gauges when the gauges are relatively rotated, then effecting a relative rotative adjustment of said gauges to cause their threads respectively to engage only the opposite flanks of the threads of the screw, and noting the relative angular positions of said gauging members.

2. A method of gauging a screw, which consists of screwing onto said screw two ring gauges whose threads constitute a continuation of the same helix but of a larger pitch diameter than the largest pitch diameter tolerable in the screw to be gauged, controlling the mutual axial motion of the gauges so that it is unequal to the apparent relative advance of the threads of said gauges when the gauges are relatively rotated first effecting a relative rotative adjustment of said gauges in one direction while thus controlled to cause their respective threads to engage only the opposite flanks of the threads of the screw, then effecting a relative rotative adjustment of said controlled gauges in the opposite direction to cause their respective threads to engage only opposite flanks of the threads of the screw, and noting the limits of such rotative adjustments.

3. The method of gauging threaded members, which comprises associating together a pair of gauge members threaded to such size as to make a loose fit with a threaded member of maximum tolerance of the size of the member to be tested, screwing together a standard threaded member of the size to be gauged and said gauge members while the threads of said gauge members lie in a common helix, controlling the mutual axial motion of the gauge members so that it is unequal to the apparent relative advance of the threads of said members when the members are relatively rotated, relatively moving said gauge members to take up slack between the threads of said gauge members and said standard threaded member first in one direction and then in the opposite direction to bring corresponding thread flanks of said gauge members respectively against opposite flanks only of the threads of the standard threaded member, noting the extent of such relative motions, removing said standard threaded member and substituting a threaded member to be tested, moving said gauge members relatively in the same manner as when said standard threaded member was associated therewith, and noting the differences in permissible relative movements of said members in opposite directions to take up slack with the threads of said member to be tested from the permissible movements of said members when said standard threaded member was associated therewith.

4. A gauge comprising a pair of threaded members each of a pitch diameter sufficiently different from basic and in the proper direction to cause said members to make a loose fit with the maximum tolerable screw to be tested, means for controlling the mutual axial motion of the members so that it is unequal to the apparent relative advance of the threads of said members when the members are relatively rotated, and means for facilitating the comparison of the relative extents of motion from said position permitted when said members are in engagement with a standard threaded member and in engagement with a threaded member to be tested.

5. A gauge comprising a pair of threaded members each of a pitch diameter sufficiently different from basic and in the proper direction to cause said member to have a loose fit with the maximum tolerable screw to be tested, means for controlling the mutual axial motion of said members so that it is unequal to the apparent relative advance of the threads of said members when the members are relatively rotated, whereby in only one angular relation the threads of both members lie in the same helical path, and means for facilitating the comparison of the permissible extents of relative angular movement of said members in opposite directions from said one angular relation when said gauge is applied to a standard threaded member and to a threaded member to be tested.

6. A gauge comprising a pair of threaded members each of a pitch diameter sufficiently different from basic and in the proper direction to cause said members to make a loose fit with the maximum tolerable screw to be tested, a support for said members, one of said members having threaded engagement with said support of smaller pitch than its gauging threads but coaxial therewith, the other of said members being carried on said support with capability of rotating about an axis eccentric to its gauging threads into and out of the position concentric with the gauging threads of said first member, there being one relative position of said members, when their gauging threads lie in a common helix, means for selectively holding either of said members in said position, and means for facilitating the comparison of the extents of movement permitted the other of said members when said gauge is applied to a standard threaded member and to a threaded member to be tested.

7. A gauge comprising a pair of internally threaded rings of a size to make a loose fit with the maximum tolerable screw to be tested, means for holding said threaded members for controlled relative motion from and to a relative position with their threads lying in a common helix, and means for indicating the permissible extents of motion in opposite directions from such position when said members are applied to a threaded member.

8. A method of gauging the flank widths of a screw thread at the pitch line thereof, which is accomplished by noting the extent of possible relative rotation alternately in opposite directions of relatively-rotatable threaded gauge members which loosely fit said screw thread and whose relative bodily axial movement is so controlled as to differ from the apparent relative advance of the thread thereof when relatively rotated while said members are engaged with said screw thread.

9. A screw thread gauge, comprising relatively-rotatable threaded members, whose threads lie in the same helix and which are formed to have a loose fit with any thread to be gauged within the limits of tolerance, means for controlling the relative bodily axial movement of said members so that it differs from the relative apparent axial movement of the threads of said member, and means for indicating the extents of permitted relative rotation alternately in opposite directions of said members while in engagement with a screw thread to be engaged.

10. A method of gauging screw threads, which comprises measuring the extent of relative apparent separating and approaching axial movement of two helically threaded elements whose rotative bodily axial movement is so controlled as to differ from the apparent relative advance of said elements when relatively rotated from an intermediate position wherein said elements form continuations of the same helix and while said elements are in engagement with the thread of a standard gauge, and comparing with said extent of apparent movement the extent of similar movement of said elements while in engagement with a screw to be tested.

11. A screw thread testing gauge comprising a pair of threaded members capable of loosely fitted engagement with a screw to be tested when said members are arranged in such relative position that their threads lie in a common helix, said members being relatively movable from said position in either direction to positions of wedging engagement between their threads and the thread of the screw to be tested, said members having respectively a scale for each direction of relative motion and an index cooperating to indicate said relative movements, said scale being calibrated to express such movements as percentage variations of flank thickness from normal of the thread to be tested.

12. A screw thread testing gauge comprising a pair of threaded members movable from a relative position in which their threads lie in a common helix and fit loosely with a thread to be tested to two opposite relative positions of binding engagement with said thread to be tested, one of said members having an index thereon, the other member having tolerance zones corresponding to each of said relative positions and cooperating with said index to indicate limits within which the relative motion of said members must fall if the thread being tested is acceptable.

In testimony whereof I have affixed my signature.

JAMES HARTNESS.